2,855,479
Patented Oct. 7, 1958

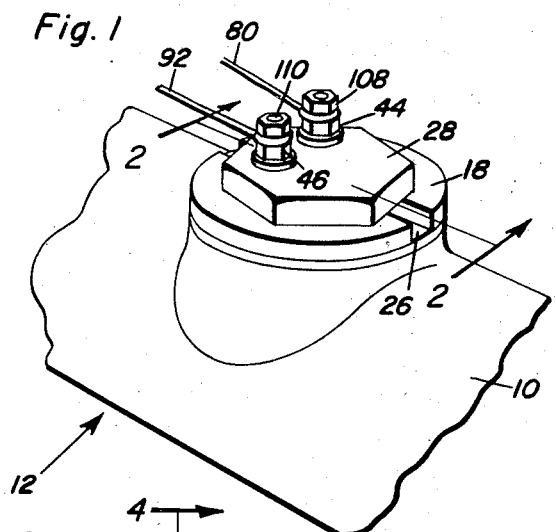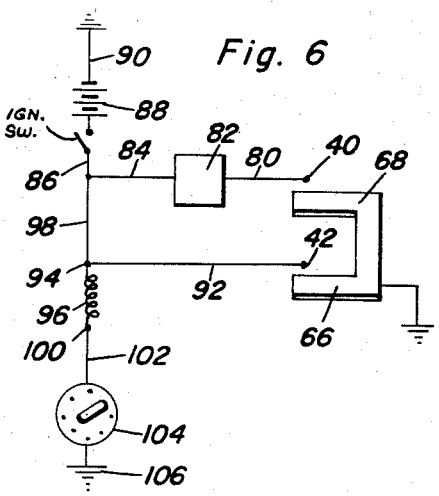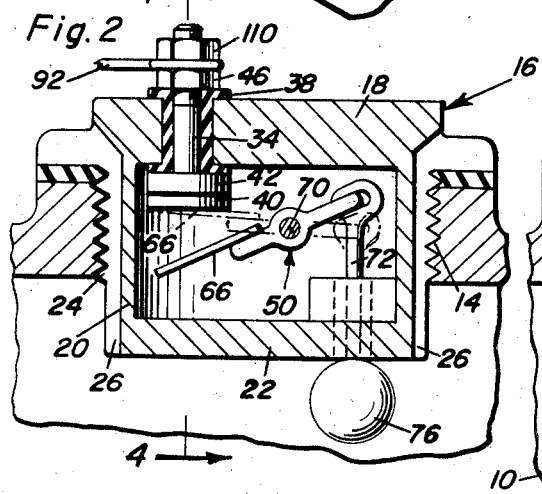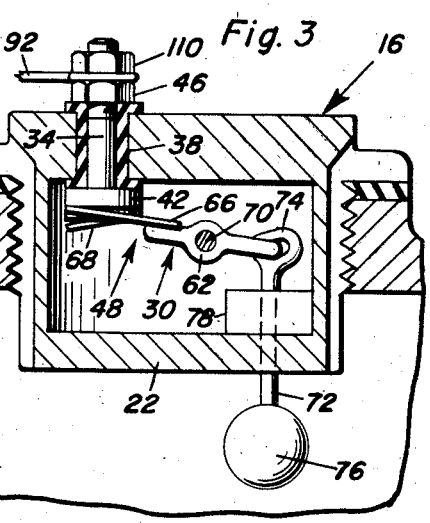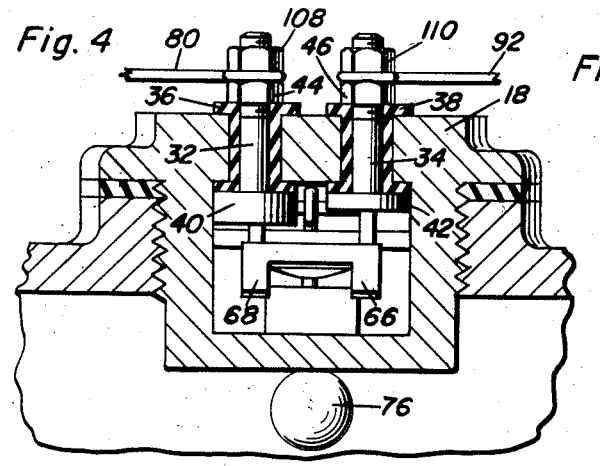
Arthur Motta
INVENTOR.

2,855,479
BRAKE-LEAK DETECTOR
Arthur Motta, Arlington, Mass.

Application June 11, 1957, Serial No. 665,079

5 Claims. (Cl. 200—84)

This invention relates in general to new and useful improvements in attachments for hydraulic brake systems, and more specifically to a detecting system for loss of brake fluid from a hydraulic brake system.

In order for a hydraulic brake system to operate properly, it is necessary that a minimum level of hydraulic brake fluid be maintained in the reservoir of a master brake cylinder. Therefore, when a minor leak develops in a hydraulic brake system, as the brake fluid drains through the leak, the level of the reservoir goes down until such time as there is insufficient amount of brake fluid in the reservoir to permit proper application of the brakes. In many instances this comes suddenly and as a result, the operator of a vehicle suddenly finds himself without brakes.

It is therefore the primary object of this invention to provide a detecting system for indicating the loss of brake fluid from a hydraulic brake system, the detecting system including an alarm for indicating when the level of hydraulic brake fluid within the master brake cylinder reservoir has reached a dangerous one, and means for shorting out the ignition coil of the vehicle upon the reaching of the level of the fluid to a predetermined lower level below which the safe operation of the vehicle is questionable.

Another object of this invention is to provide an improved switch mechanism for a detecting system, the switch mechanism being incorporated in a cap for a master brake cylinder reservoir, the switch mechanism including two individual terminals each having a contact, and there being a bridging member mounted within the cap for selectively grounding the terminals by engagement with the contacts.

A further object of this invention is to provide an improved detecting system for indicating the loss of brake fluid from a hydraulic brake system, the detecting system including a switch mechanism which includes first and second terminals to which there may be attached a single device and an ignition coil shorting wire, respectively, the switch mechanism including a bridging member having a pair of fingers engageable with contacts to the terminals, the relationship between one contact and one finger being different from that between the relationship between the other contact and other finger whereby the contact for the alarm device is first engaged and then the contact for the shorting wire is then engaged.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary perspective view of a reservoir portion of a master brake cylinder and shows the details of the switch mechanism mounted thereon;

Figure 2 is an enlarged fragmentary sectional view taken substantially upon the plane indicated by the section line 2—2 of Figure 1 and shows the details of the switch mechanism, the bridging member being shown in an inoperative position by solid lines and in an operative position by dotted lines;

Figure 3 is a fragmentary sectional view similar to Figure 2 and shows the fingers of the bridging member engaging both of the contacts;

Figure 4 is an enlarged fragmentary sectional view taken substantially upon the plane indicated by the section line 4—4 of Figure 2 and shows further the details of the switch mechanism;

Figure 5 is an enlarged perspective view of the bridging member; and

Figure 6 is a wiring diagram of the detecting system.

Referring now to the drawings in detail, it will be seen that there is illustrated in Figure 1 a reservoir portion 10 of a master brake cylinder which is referred to in general by the reference numeral 12. The reservoir 10 includes an internally threaded filling opening 14 which is normally closed by a filler cap 16. The filler cap 16 includes a top wall 18, a generally cylindrical body portion 20 and a bottom wall 22. An upper part of the body portion 22 is provided with external threads 24 which are engaged with the threads of the filler opening 14 to retain the filler cap 16 in place. A part of the body portion 24 as well as a part of the top wall 18 is broken away to form vents 26. The top wall 18 also includes a nut portion 28 to faciliate the turning of the filler cap 16.

Incorporated in the filler cap 18 is a switch mechanism which is referred to in general by the reference numeral 30. It may be considered that the filler cap 16 is a part of the switch mechanism 30.

Extending through the top wall 18 is a pair of terminals 32 and 34. The terminals 32 and 34 are insulated with respect to each other and to the top wall 18 by means of insulated bushings 36 and 38, respectively. The lower end of the terminal 34 is in the form of an enlarged head which functions as a contact 40. The lower end of the terminal 34 is also in the form of an enlarged head which functions as a contact 42. The terminal 32 is retained in place by a nut 44 threadedly engaged on the upper end thereof. A similar nut 46 is threadedly engaged on the upper end of the terminal 34 to retain it in place.

Referring now to Figure 5 in particular, it will be seen that there is illustrated a bridging member which is referred to in general by the reference numeral 48. The bridging member 48 includes a mounting bracket 50 which is formed of a pair of spaced arms 52 and 54 connected together their first ends by a transverse member 56 and at the opposite ends by a transverse member 58. The arms 52 and 54 are provided with central eyes 60 and 62, respectively, which are transversely aligned.

Secured to the member 58 is a cross bar 64 which has formed integral therewith a pair of spaced fingers 66 and 68. The fingers 66 and 68, as well as the cross bar 64, are formed of thin resilient material.

Extending transversely through the body portion 20 is a pivot pin 70 which passes through the eyes 60 and 62 to pivotally mount the bridging member 48. Carried by the transverse member 56 is a float rod 72 whose upper end is in the form of an eye 74 receiving the transverse member 56. The lower end of the float rod 72 extends down through the bottom wall 22 of the filler cap 16 and is provided with a float 76 which is intended to float within the hydraulic brake fluid normally disposed within the reservoir 10. The bottom wall 22 is provided with a thickened portion 78 to facilitate the guiding of the float rod 72.

As is best shown in Figure 4, the contact 40 extends down below the contact 42. The fingers 66 and 68 are coplanar with the finger 66 being aligned with the contact 42 and the finger 68 being aligned with the contact 40. As the level of the brake flow within the reservoir 10 goes down, the fingers 66 and 68 move upwardly towards the contacts 42 and 40, respectively. The finger 68 first engages the contact 40 because it is lower than the contact 42. Further downward movement of the float 76 will result in the bending of the contact 68, as is shown in Figure 3, and the resultant engagement of the contact 42 by the finger 66.

The bridging member 48 is either grounded to the filler cap 16 by the pivot pin 70 or by a grounding wire (not shown).

Referring now to Figure 6 in particular, it will be seen that connected to the terminal 32 is a wire 80 which is in turn connected to a suitable alarm device 82. The alarm device 82 is connected by means of a wire 84 to a main lead wire 86 from a battery 88. The battery 88 is gathered by means of a wire 90. Thus when the finger 68 engages the contact 40 of the terminal 32, the alarm device 82 will be actuated.

Connected to the terminal 34 is an ignition coil grounding wire 92. The ignition coil grounding wire 92 is connected to a primary terminal 94 of an ignition coil 96. Also connected to the primary terminal 94 is a wire 98 whose opposite end is connected to the main lead wire 86. The ignition coil 96 also includes a secondary terminal 100 to which there is connected a wire 102 whose opposite end is connected to a distributor 104, the distributor 104 being grounded as at 106.

Should the operator of the vehicle continue to operate it after the alarm device 82 is actuated, as the level of the brake fluid within the reservoir 10 becomes lower, the finger 66 will engage the contact 42 of the terminal 34. This will result in the grounding of the ignition coil 96 and the elimination of the operation thereof. This will automatically stop the engine of the vehicle of which the present invention is a part. Thus the operator of the vehicle will be unable to drive it and will not be able to get into trouble because of the failure of the brakes thereof.

Referring now to Figure 4 in particular, it will be seen that the wire 80 is connected to the terminal 32 by means of a nut 108, the end of the wire 80 being clamped between the nut 108 and the nut 44. The wire 92 is connected to the terminal 34 by means of a nut 110. The end of the wire 92 is clamped between the nut 110 and the nut 46.

From the foregoing description of the present invention, it will be readily apparent that it may be installed either in existing vehicles or in new vehicle constructions. Further, because of the relative simplicity of the invention, the cost of the invention is relatively small. Further, the invention has a great advantage in that it first warns the operator of the vehicle as to the fact that the level of the brake fluid is reaching a danger point and when the level does finally reach the danger point, it prevents the operator of the vehicle from driving the vehicle further.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A switch mechanism for use in a detecting system for the loss of brake fluid from a hydraulic brake system, said switch mechanism comprising a cap for a master brake cylinder reservoir, said cap being hollow and including a top wall, a pair of adjacent terminals, means mounting said terminals in said top wall in insulated relation relative to each other and to said cap, each of said terminals including a contact positioned within said cap, a bridging member disposed within said cap and grounded relative thereto, means pivotally mounting said bridging member, said bridging member being U-shaped in outline including a pair of spaced parallel contact fingers, said contact fingers being separate and aligned with said contacts, a float attached to said bridging member for positioning said bridging member, said float depending below said caps for positioning in a master brake cylinder reservoir.

2. A switch mechanism for use in a detecting system for the loss of brake fluid from a hydraulic brake system, said switch mechanism comprising a cap for a master brake cylinder reservoir, said cap being hollow and including a top wall, a pair of terminals, means mounting said terminals in said top wall in insulated relation relative to each other and to said cap, each of said terminals including a contact positioned within said cap, a bridging member disposed within said cap and grounded relative thereto, means pivotally mounting said bridging member, said bridging member including a pair of contact fingers, said contact fingers being separate and aligned with said contacts, a float attached to said bridging member for positioning said bridging member, said float depending below said cap for positioning in a master brake cylinder reservoir, said fingers being unequally spaced from their respective contacts whereby first one of said contacts is engaged and then the other, at least said finger aligned with said one contact being resilient.

3. A detecting system for the loss of brake fluid from a hydraulic brake system, said detecting system comprising a switch mechanism including a cap for a master brake cylinder reservoir, said cap being hollow and including a top wall, a pair of terminals, means mounting said terminals in said top wall in insulated relation relative to each other and to said cap, each of said terminals including a contact positioned within said cap, a bridging member disposed within said cap and grounded relative thereto, means pivotally mounting said bridging member, said bridging member including a pair of contact fingers, said contact fingers being separate and aligned with said contacts, a float attached to said bridging member for positioning said bridging member, said float depending below said cap for positioning in a master brake cylinder reservoir, an alarm device connected to one of said terminals, an ignition and coil grounding wire connected to the other of said terminals.

4. A detecting system for the loss of brake fluid from a hydraulic brake system, said detecting system comprising a switch mechanism including a cap for a master brake cylinder reservoir, said cap being hollow and including a top wall, a pair of terminals, means mounting said terminals in said top wall in insulated relation relative to each other and to said cap, each of said terminals including a contact positioned within said cap, a bridging member disposed within said cap and grounded relative thereto, means pivotally mounting said bridging member, said bridging member including a pair of contact fingers, said contact fingers being separate and aligned with said contacts, a float attached to said bridging member for positioning said bridging member, said float depending below said cap for positioning in a master brake cylinder reservoir, an alarm device connected to one of said terminals, an ignition and coil grounding wire connected to the other of said terminals, said fingers being unequally spaced from their respective contacts whereby first one of said contacts is engaged and then the other, at least said finger aligned with said one contact being resilient.

5. A detecting system for the loss of brake fluid from a hydraulic brake system, said detecting system comprising a switch mechanism including a cap for a master brake cylinder reservoir, said cap being hollow and including a top wall, a pair of terminals, means mounting said terminals in said top wall in insulated relation relative to said other and to said cap, each of said terminals including a contact positioned within said cap, a bridging member disposed within said cap and grounded relative thereto, means pivotally mounting said bridging member, said bridging member including a pair of contact fingers, said contact fingers being separate and aligned with said contacts, a float attached to said bridging member for positioning said bridging member, said float depending below said cap for positioning in a master brake cylinder reservoir, an alarm device connected to one of said terminals, an ignition and coil grounding wire connected to the other of said terminals, said fingers being unequally spaced from their respective contacts whereby first one of said contacts is engaged and then the other, at least said finger aligned with said one contact being resilient, said one contact being connected to said one terminal.

References Cited in the file of this patent

UNITED STATES PATENTS

| | | |
|---|---|---|
| 1,718,241 | Laas | June 25, 1929 |
| 1,802,383 | Jarvis | Apr. 28, 1931 |
| 2,735,909 | Floyd et al. | Feb. 21, 1956 |